March 15, 1927.
L. ROAN
1,620,785
CABLE OPERATED CONVEYER
Filed July 20, 1926      5 Sheets-Sheet 5
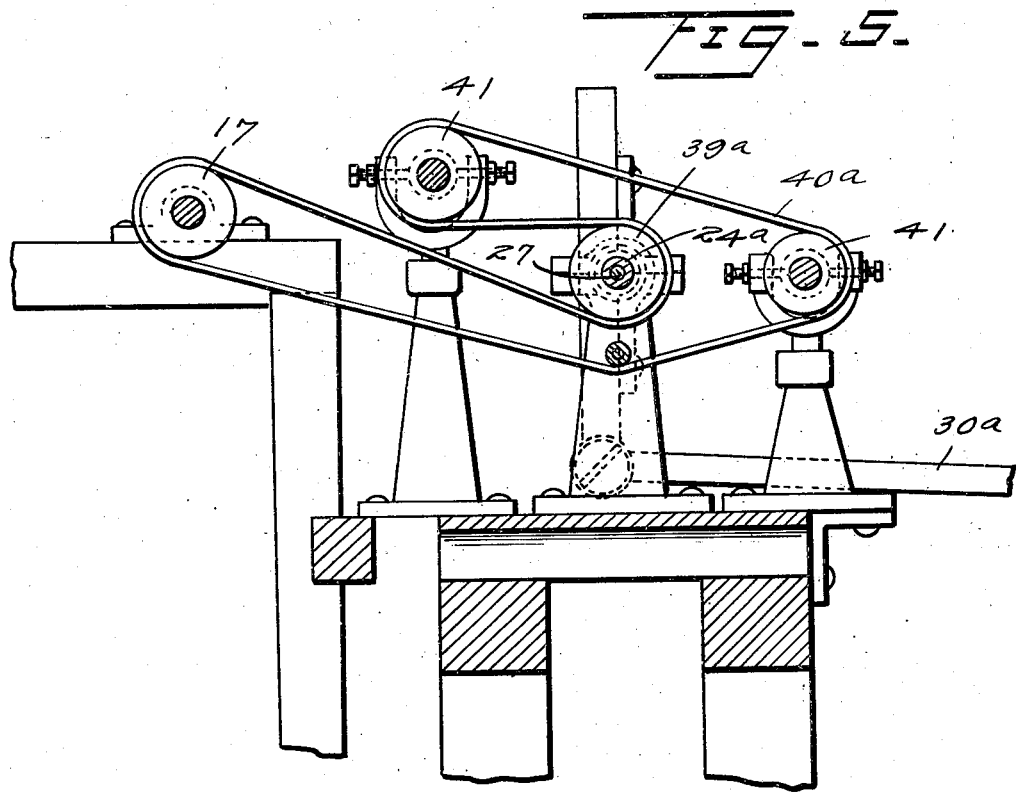
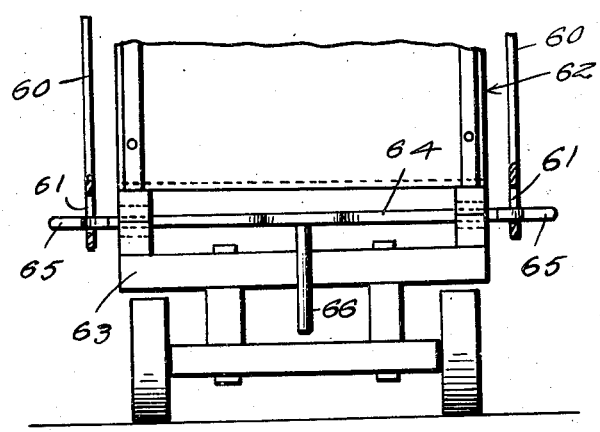
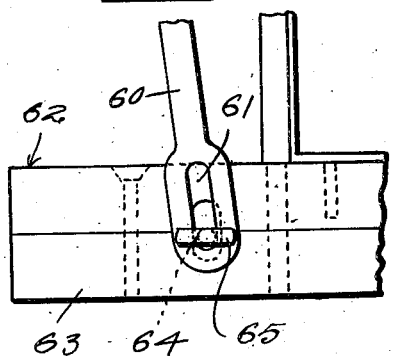
Inventor
Luther Roan
By Watson E. Coleman,
Attorney Patented Mar. 15, 1927.

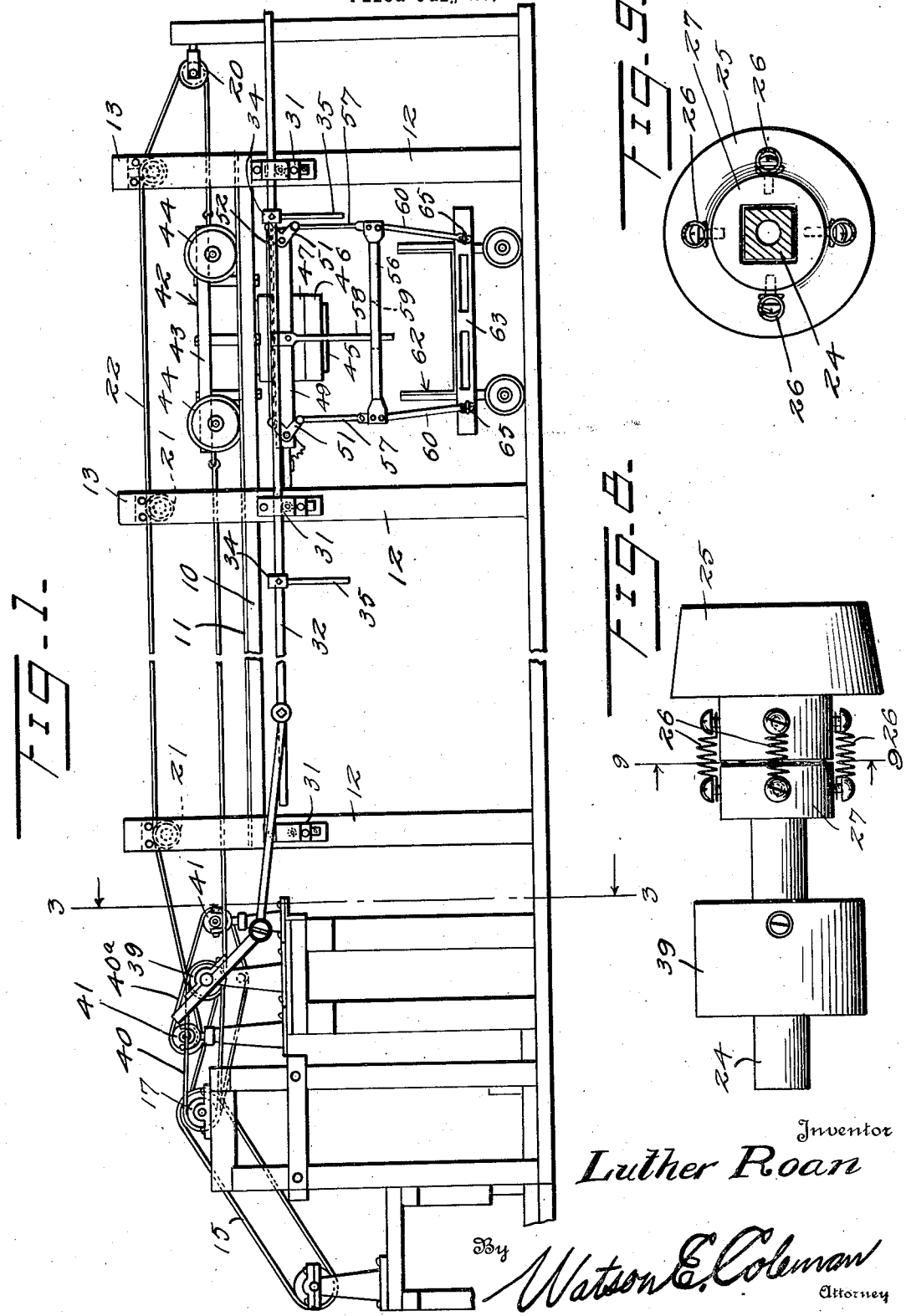

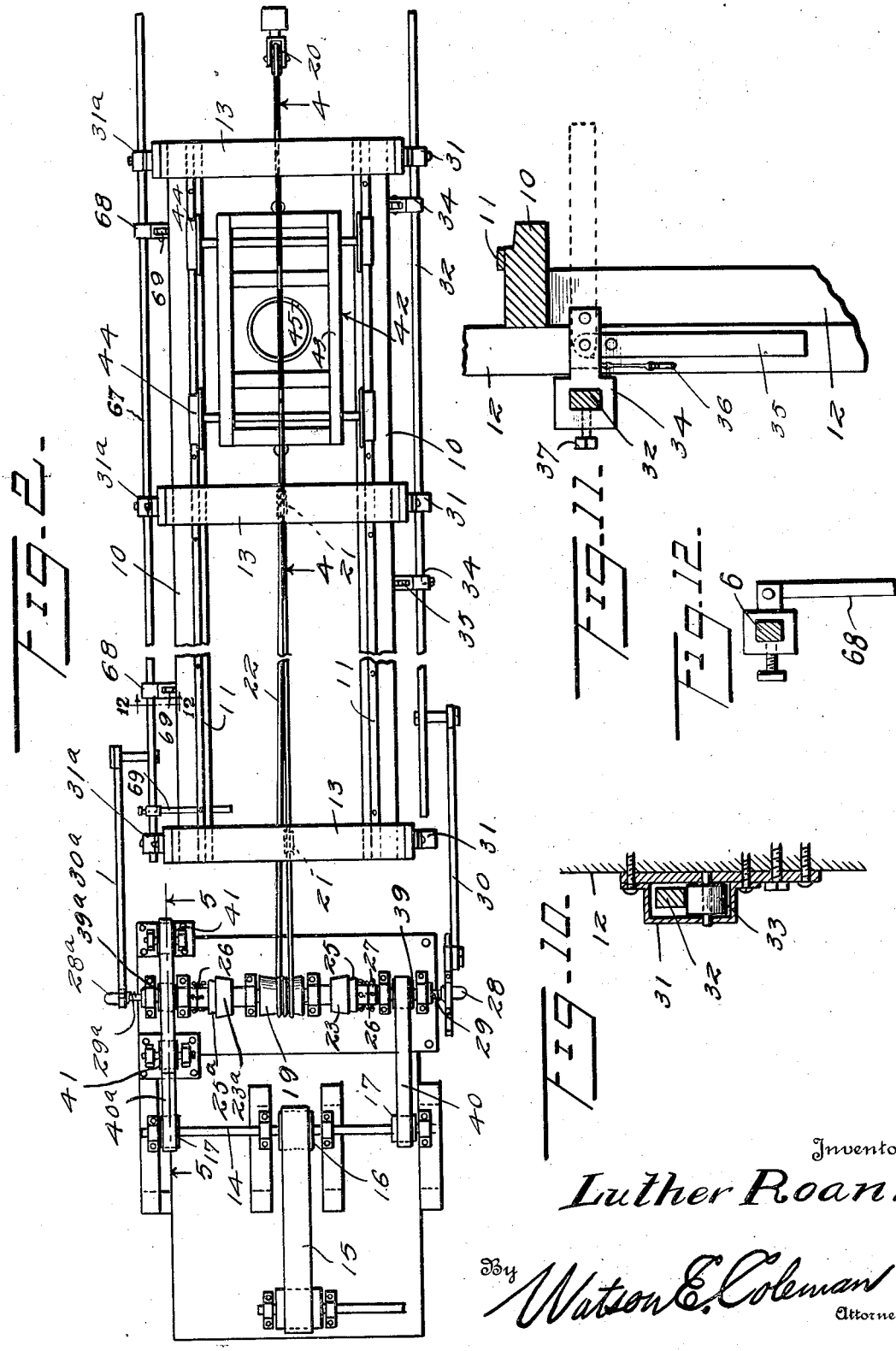

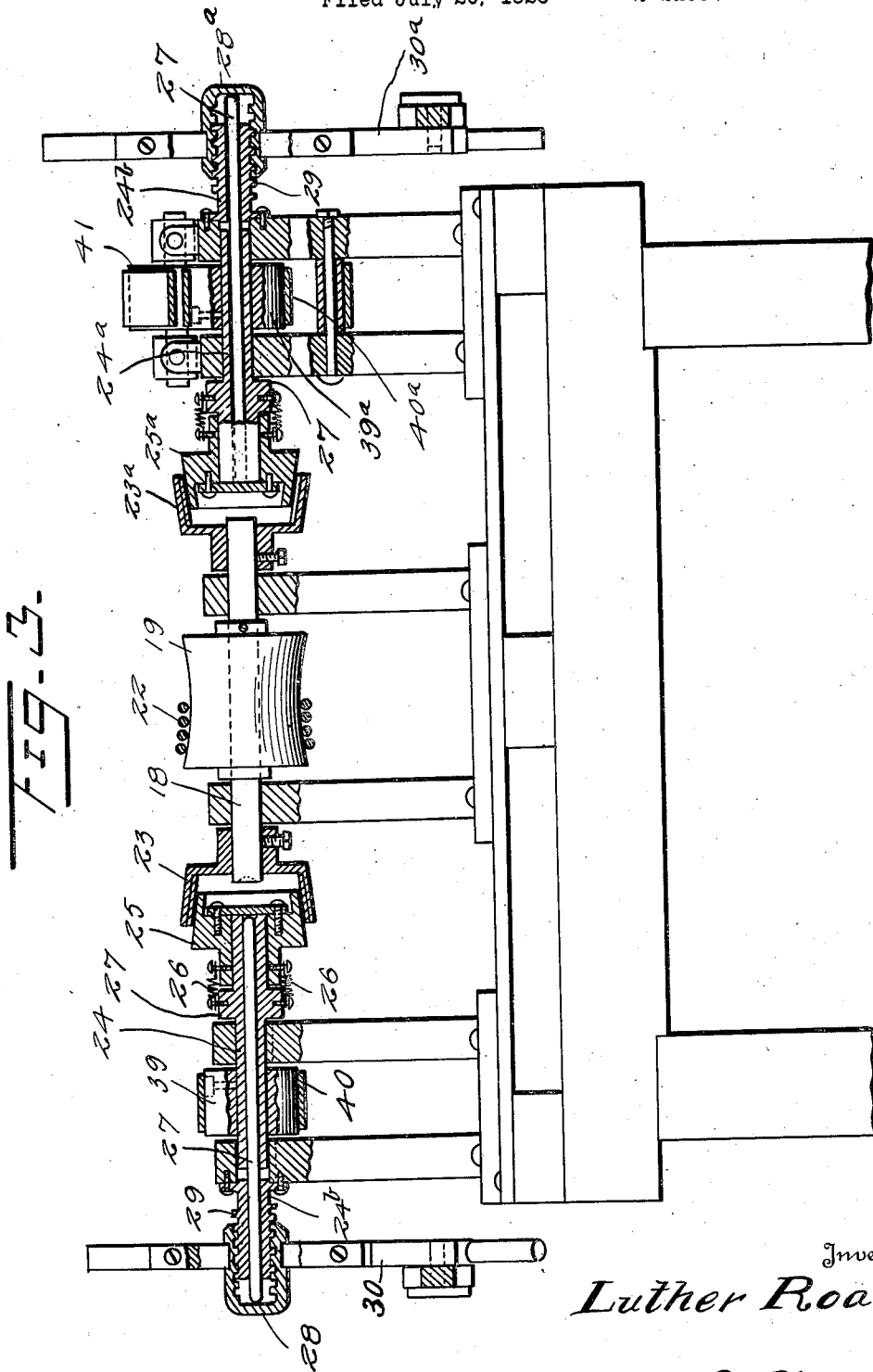

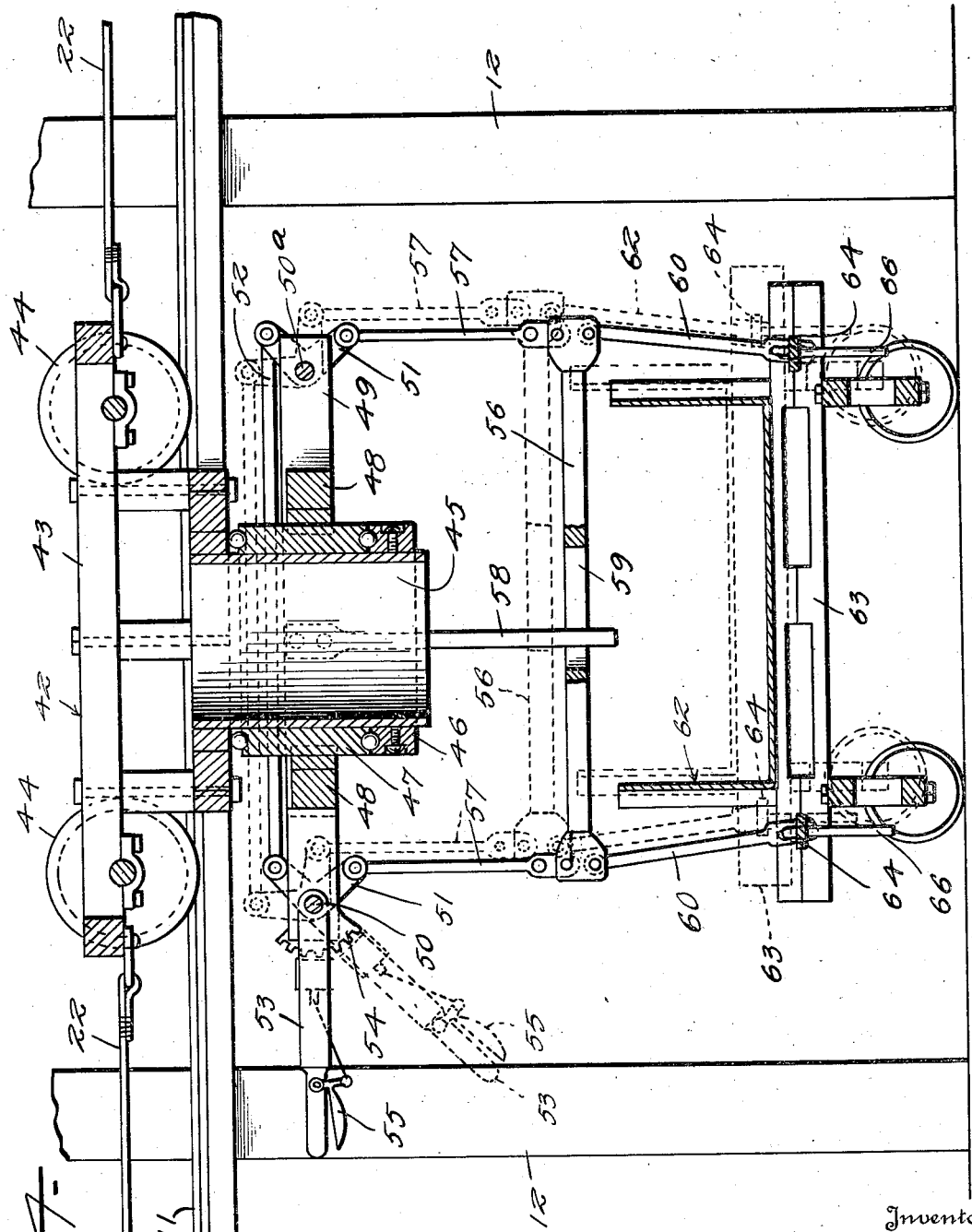

1,620,785

UNITED STATES PATENT OFFICE.

LUTHER ROAN, OF RIVES, MISSOURI.

CABLE-OPERATED CONVEYER.

Application filed July 20, 1926. Serial No. 123,710.

This invention relates to devices used in warehouses and in yards for conveying material from one point to another as, for instance, from a mill to a yard where the material is piled or for carrying other material and the general object of the invention is to provide a conveyer of this character which will do away with the necessity of using horses, wagons and operatives for the purpose of hauling the material through the yard and discharging it and substitute for this purpose a conveyer which is adapted to be moved from an initial position to any one of a plurality of discharge positions, this conveyer being adapted to carry a truck upon which the material may be piled and the truck being detachably connected to the conveyer so that it may be detached therefrom and then shifted by hand to any desired point in the yard or warehouse.

Another object is to provide means whereby the conveyer with its truck may return from any point in the yard to its initial position where the truck may be again loaded or whereby the conveyer may be returned without the truck to receive a freshly loaded truck.

Still another object is to provide a construction of this character embodying rails upon which the conveyer moves and stops disposed at intervals along the supporting framework for the rails, which stops are shiftable manually into a position to stop the motion of the conveyer cable and bring the conveyer to a halt.

Still another object is to provide a conveyer with a turntable with which the truck is engaged so that when it is desired to disengage the truck from the turntable, the turntable may be shifted to bring the truck into position where it may be run off in the direction required.

A further object is to provide a conveyer of this character with a conveying cable whereby the carriage of the conveyer is shifted, a driving shaft for the cable and with which the cable is engaged, and means whereby power may be transmitted to the driving shaft to cause it to ride in either direction, one of said means being operated by a lever at the middle, and the other means being operated by a lever or levers located at a distance from the middle or loading point of the conveyer.
Other objects have to do with the details of construction and arrangement of parts to appear more fully hereinafter.

My invention is illustrated in the accompanying drawings wherein:—

Figure 1 is a side elevation of a cable conveyer constructed in accordance with my invention;

Fig. 2 is a top plan view of the structure shown in Figure 1;

Fig. 3 is a section on the line 3—3 of Figure 1;

Fig. 4 is a fragmentary longitudinal section on the line 4—4 of Figure 2;

Fig. 5 is a fragmentary section on the line 5—5 of Figure 2;

Fig. 6 is a fragmentary front elevation of the truck;

Fig. 7 is a detailed elevation showing the manner of connecting the truck to the carriage;

Fig. 8 is a side elevation of one of the clutches;

Fig. 9 is a section on the line 9—9 of Figure 8;

Fig. 10 is a sectional view through one of the brackets for supporting the rod 32;

Fig. 11 is a sectional view through the track showing one of the stops in elevation.

Figure 12 is a sectional view through the rod controlling the return of the carriage and showing the handle thereon.

Referring to these drawings it will be seen that I have provided longitudinally extending supporting beams 10 upon which rails 11 are mounted, these beams being supported by any suitable supporting structure as, for instance, by the uprights 12 and the cross beams 13. The rails and their supporting beams may be of any desired length as, for instance, the full length of the warehouse or the full length of the yard and while I have illustrated the tracks as extending straight away, it will be understood that the tracks might extend laterally at any desired point so that the conveyer may take a circuitous course if necessary.

Mounted at the loading end of the tracks upon a suitable framework is a transverse shaft 14 which may be driven in any suitable manner from any suitable motor and is illustrated as being driven by a belt 15 passing over a drum 16. This shaft is illustrated as carrying the belt wheels 17. Disposed in advance of the shaft 14 and parallel thereto is a shaft 18 carrying upon it a winding drum 19, this shaft being mounted in suitable bearings, and passing several times around this winding drum 19 and over a terminal pulley 20 and over guide pulleys 21 is a cable 22, the end of which is connected to a carriage operating over the rails 11, as will be more fully described.

The cable 22, after it passes around the drum 19, returns to the carriage and is attached to the opposite end of the carriage from the first named end of the cable. Thus, it will be seen that as the shaft 18 is rotated in one direction, the cable will be shifted so as to move the carriage on the rails 11 away from the loading point and when the shaft is rotated in the opposite direction, the carriage will be drawn toward the loading point.

For the purpose of causing the operation of the shaft 18 in either of two directions I mount upon the shaft 18 the two oppositely directed cone clutch members 23 and $23^a$. Disposed in alignment with the shaft 18 are the shafts 24 and $24^a$, each being supported in suitable bearings and carrying the longitudinally shiftable clutch members 25 and $25^a$. Each clutch member 25 is retracted from its corresponding member 23 by means of the springs 26, these springs being engaged with a collar 27 mounted upon the shaft 24 or $24^a$.

For the purpose of shifting the clutch member 25 into engagement with the clutch member 23 I dispose through the hollow shaft 24 a rod 27 which may protrude beyond the tubular shaft 24. Engaged with a fixed screw-threaded member $28^a$ is a head 28 into which the rod 27 extends so that when this head is rotated in one direction, the screw-threads 29 thereof will engage the screw-threads of the member and cause the head to move inward, thus moving the rod 27 inward and shifting the clutch member 25 into engagement with the clutch member 23. Of course, the threads 29 are relatively quick so that a relatively slight rotative movement of the head 28 will cause the rod 27 to move inward a relatively great distance and thus shift the clutch member 25. The head 28 is rotatably shifted by means of a controlling lever 30. Like means are used upon the opposite end of shaft $24^a$ for the purpose of moving the clutch member $25^a$ into engagement with the clutch member $23^a$ but in order to distinguish the two operating means apart, the operating lever at the last named end of the shaft $24^a$ is designated $30^a$ and the head $28^a$.

Operating in guides 31 upon the vertical member 12 is a stop carrying rod 32. This rod operates over rollers 33 in the guides and at any desired intervals upon the rods there are mounted stops, one of which is illustrated in Figure 11. Each stop consists of a body 34 slidingly mounted upon the rectangular rod 32 and pivotally mounted upon each body 34 is a finger 35 which may be turned either into a depending position or into a horizontally projected position. The finger 35 is held in its projected position by means of the pin 36, for instance, passing through an aperture in the finger 35 and in the body 34. If this pin is withdrawn the finger 35 will drop out of the way. Any other means may be used for the purpose of latching the finger 35 in its projected position. The body 34 is in the nature of a slide and is slidably mounted upon the rod 32 so that it may be shifted to any convenient position and then held in this position by means of a set screw 37. This rod 32 is connected to the lever 30 by means of a link 38. A band wheel 39 is mounted upon the shaft 24 and a like band wheel $39^a$ is mounted upon the shaft $24^a$. A belt 40 passes over the band wheel 39 and around one of the band wheels 17 and a belt $40^a$ passes around the other band wheel 17 and around supporting wheels 41, the upper flight of the belt engaging the band wheel $39^a$. Thus it will be seen that rotation of the shaft 14 in one direction will transmit rotation in reverse directions to the shafts 24 and $24^a$ respectively and that through the clutches, the shaft 18 may be driven either in one direction or the other.

Operating over the rails 11 is a carriage designated generally 42 which includes longitudinally extending frame beams 43 and supporting wheels 44 which engage the rails. Mounted upon the carriage is a fixed depending cylinder 45 which at its lower end carries an outwardly projecting collar 46 and mounted upon the cylinder 45 and rotating upon the collar 46 and supported upon ball bearings is an outer cylinder 47. The cylinders 45 and 47 together constitute a turntable. Carried upon the cylinder 47 are the transversely extending beams 48 having longitudinal members 49, the members 49 projecting beyond their intersection with the beams 48. Extending transversely through these projecting portions of the members 49 are rock shafts 50 and mounted upon the ends of these rock shafts are bell crank levers 51, the bell crank levers on the shaft 50 being connected to the bell crank levers of the shaft $50^a$ by links 52 so that all of the bell crank levers will operate simultaneously. Mounted upon the shaft 50 is a lever 53 which operates over an arcuate rack 54, the lever carrying a grip operated latch 55 whereby the lever may be locked in either a depressed or raised position.

Disposed below the beams 49 are the longitudinally extending beams 56 which are bifurcated at their ends and pivotally connected to links 57 which in turn are pivotally connected to the lower arms of the bell crank levers 51. Guides 58 are attached to the beams 49 and extend downward therefrom into longitudinally extending slots 59 formed in the beams 56. Pivotally connected to the extremities of the beams 56 are the depending links 60 and the lower ends of these links are formed with elongated eyes 61 which are adapted to be connected to a truck designated generally 62. This truck embodies a wheel supported frame and the beams 63 of the truck carry at each end a transversely extending rod 64, the extremities of which are laterally enlarged and flattened to form relatively flat heads 65. When these heads are turned into parallel relation to the eyes 61 the links 60 may be disengaged from the truck. When the rod 64 is rotated, however, through a quarter circle, the heads will be disposed at right angles to the length of the eyes and the eyes will be locked from detachment. A handle 66 is mounted upon each of the rods 64, this handle having sufficient weight to normally rotate the rod to a position where its heads 65 are at right angles to the eyes.

With the mechanism which has been described it is obvious that a truck may be shifted to any desired position by means of the carriage and cable. The truck may be lowered by shifting the lever 53. The truck may then be detached from the carriage and run off to any desired place by hand power. It will be obvious that the truck may be as readily engaged with the carriage, raised by operating the lever 53 so as to lift the wheels off the ground, and then the carriage and the truck, sent back to its initial loading point by operating the clutch member 25ª. To this end I mounted upon the shaft 24ª the lever 30ª and this lever is pivotally connected to a rod 67 mounted in guides 31ª and this rod 67 is provided at convenient intervals with handles 68 whereby the rod may be shifted. It will be obvious that when the rod is shifted in one direction, the head 28ª will be rotated so as to shift the clutch member 25ª into engagement with the clutch member 23ª to thus reversely rotate the drum 19 and draw the carriage home. A stop 69 of the same general character as stop 35 is mounted upon the rod 67 and is adapted to be struck by the carriage when the carriage nears the receiving point to thus shift the rod 67 in a direction to cause the release of the clutch member 25ª from clutch member 23ª, and this causes the stoppage of the carriage.

The operation of this mechanism is as follows:—The truck, at the loading point, is engaged with the carriage by means of the links 60 and the truck is then loaded with the material. Previous to this the proper stop 35 has been set to stop the carriage where it is desired to unload the truck or shift the truck from the carriage and when the truck is loaded, the lever 30 is operated which throws in the clutch which connects shaft section 18 and the shaft section 24 and this causes the cable 22 to pull the carriage along the track. When the carriage reaches the stop 35 which is projected out into the path of the carriage, the carriage strikes the stop. This shifts the rod 32 longitudinally and as a consequence, releases the clutch and the cable comes to a stop. The truck may then be swung around upon the truntable to any degree required and then by means of the lever 53, the truck is lowered. The links 60 are then detached from the cross bar 64 and the truck may move away to its destination. If desired, the carriage may be sent directly back by operating the nearest lever 68, these levers being disposed at frequent distances upon the shipper rod 67. This throws in the clutch members 23ª and 25ª and causes the reverse movement of the shaft section 18. When the carriage reaches the stop 69 the shipper rod 67 is shifted into a position to detach engagement between the clutch members 23ª and 25ª and the carriage comes to a stop whereupon a newly filled truck may be engaged with the carriage and the operation repeated or, of course, the carriage may remain at the unloading point until the truck nas been unloaded and then the empty truck reloaded upon the carriage and sent back to the loading point.

It will be seen that this mechanism is capable of a large variety of uses in many differing circumstances. It is particularly convenient, however, for lumber yards, mills, warehouses and in like situations where it is desired to shift materials from a delivering point to separated points within the yard or warehouse. This mechanism, of course, need not be driven constantly and even if the shaft 14 be constantly connected to power and driven thereby, very little power will be used except during the actual movement of the carriage. This handling mechanism will reduce the number of men necessary to employ in the yard and do away with the use of teams and the attendant hostlers or stablemen.

While I have illustrated a construction which I believe to be particularly effective for the purpose intended, I do not wish to be limited to the details of construction and arrangement of parts as these might be modified in many ways without departing from the spirit of the invention. Attention is called to the fact that the shaft sections 15, 24 and 24ª constitute in effect a single countershaft to which power may be applied to drive it in one direction or the other. Any clutch mechanism may be used in place of the specific clutch mechanism which I have disclosed and it is obvious that the clutches with their respective drive pulleys or band wheels might be loosely mounted upon a single countershaft and the clutches actuated or released to drive the shaft or allow it to remain idle or drive the shaft in either direction.

I claim:—

1. A conveyer of the character described comprising a supporting section, a track thereon, a carriage movable on the track, a shaft having a drum, a cable extending over the drum and connected at opposite ends to the carriage, guides for the cable, driving means for said shaft, manually controlled means located at a loading point whereby the shaft may be connected to the driving means to drive the shaft in a direction to move the carriage away from the loading point, manually adjustable means movable into the path of movement of the carriage and acting to automatically disconnect the shaft from the driving means when the carriage engages said adjustable means, and manually controlled means for connecting the shaft to its driving means and driving the shaft in a direction to return the carriage to the loading point.

2. A conveyer comprising a supporting structure, a track thereon, a carriage movable on the track, manually controlled means for causing the carriage to move away from a predetermined loading point under power, manually adjustable means disposed in the path of movement of the carriage acting to automatically stop the carriage when it has reached a predetermined position, manually operable means for causing the return of the carriage to its loading position under power, and means acting to automatically stop the carriage when it has reached its loading position.

3. A conveyer comprising a supporting structure, a track thereon, a carriage movable over the track, a cable connected at its opposite ends to the carriage, a drum over which the cable passes, manually controlled means for connecting the drum to a source of power to move the carriage from a loading position, a plurality of manually adjustable means disposed at intervals along the track and each adapted to be shifted into the path of movement of the carriage and acting to disconnect the drum from the source of power when engaged by the carriage, manually controllable means disposed at intervals along the track whereby the drum may be connected to a source of power and caused to move in a direction to return the carriage to its initial loading position, and means acting automatically to disconnect the drum from the source of power when the carriage has reached its loading position.

4. A conveyer comprising a supporting structure, tracks thereon, a carriage movable over the tracks, a cable connected to said carriage to shift it, a drum over which the cable passes, manually controlled means located at the loading point for said carriage whereby the drum may be connected to a source of power to shift the carriage away from said loading point, means located at intervals along the length of the track whereby the drum may be automatically disconnected from the source of power by the engagement of the carriage and said means, each of said means being independently shiftable into the path of movement of the carriage, manually operable means located at intervals along the track whereby the drum may be connected to a source of power and caused to reverse the movement of the cable and return the carriage to its loading position, and means for automatically disconnecting the drum from the source of power when the carriage has returned to its loading position.

5. A conveyer of the character described comprising a supporting structure having tracks, a wheeled carriage movable upon the tracks, an endless cable connected at its ends to the carriage, a drum over which the cable passes, a drive shaft, manually operable means located adjacent the drum for connecting the drum to the drive shaft and causing a rotation of the drum in a direction to move the carriage away from the drum and including a lever, a reverse movement of the lever acting to disconnect the drum from the drive shaft, a rod extending along said supporting structure and mounted thereon for sliding movement and operatively connected to the lever, stops arranged at intervals along said rod and each manually shiftable into or out of a position across the path of movement of the carriage whereby the engagement of the carriage with the stop will cause the longitudinal movement of the rod and the actuation of the lever to release the driving connection between the drive shaft and the drum, means for connecting the drum with the drive shaft to cause a reverse movement of the drum and including a lever, a rod connected to the lever and extending along the supporting structure and slidingly mounted thereon, means disposed at intervals along the structure whereby said rod may be manually shifted to connect the drum with the driving means, and means located adjacent the drum for causing the automatic release of the drum from the driving means to thereby bring the carriage to a stop.

6. A conveyer of the character described comprising a supporting structure having tracks, a wheeled carriage movable upon the tracks, an endless cable connected at its ends to the carriage, a drum over which the cable passes, a drive shaft, manually operable means located adjacent the drum for connecting the drum to the drive shaft and causing a rotation of the drum in a direction to move the carriage away from the drum and including a lever, a reverse movement of the lever acting to disconnect the drum from the drive shaft, a rod extending along said supporting structure and mounted thereon for sliding movement and operatively connected to the lever, stops arranged at intervals along said rod and each manually shiftable into or out of a position across the path of movement of the carriage whereby the engagement of the carriage with the stop will cause the longitudinal movement of the rod and the actuation of the lever to release the driving connection between the drive shaft and the drum, means for connecting the drum with the drive shaft to cause a reverse movement of the drum and including a lever, a rod connected to the lever and extending along the supporting structure and slidingly mounted thereon, means disposed at intervals along the structure whereby said rod may be manually shifted to connect the drum with the driving means, and a lever mounted upon said last named rod and projecting into the path of movement of the carriage and when engaged by the carriage disconnecting the drum from the driving means.

7. A conveyer comprising a supporting structure having tracks, a wheeled carriage movable over the tracks, truck supporting means mounted upon the carriage, a cable having its ends connected to the carriage, a drum over which the cable passes, a power actuated driving shaft, band wheels operatively engaged with the driving shaft, said band wheels being driven in reverse directions, clutch operated means for operatively connecting one of said band wheels to the drum to cause a movement of the cable in a direction to shift the carriage outward from the drum, means disposed at intervals along the supporting structure and manually adjustable into or out of an operative position adapted to cause the disconnection of one of said clutch operated means to thereby bring the carriage to a stop, manually operable means disposed at intervals along the supporting structure whereby the other clutch may be shifted to engage the drum with the driving means for movement in a reverse direction, and means actuated by the arrival of the carriage at a loading point adjacent the drum acting to release said last named clutch.

8. A conveyer comprising a supporting structure, a track thereon, a wheeled carriage movable over the track, means for shifting the carriage over the track including a drum and a cable engaging the drum and the carriage, manually operable means for connecting the drum to a source of power to rotate the drum in one direction, and manually adjustable means for stopping the movement of the drum including a longitudinally shiftable rod mounted upon the supporting structure, and a plurality of stops disposed at intervals along the rod and manually adjustable each independently of the other into or out of a position in the path of movement of the carriage.

9. A conveyer of the character described comprising a supporting structure, a track thereon, a wheeled carriage movable over the track, means for shifting the carriage over the track including a drum and a cable engaging the drum and the carriage, manually operable means for connecting the drum to a source of power to rotate the drum in one direction, and manually adjustable means for stopping the movement of the drum including a longitudinally shiftable rod mounted upon the supporting structure, and a plurality of stops disposed at intervals along the rod and manually adjustable each independently of the other into or out of a position in the path of movement of the carriage, each of said means including a body, a finger pivotally mounted upon the body, means for holding the finger raised and projected, and means for holding the body in adjusted position upon the rod.

10. A conveyer of the character described comprising a supporting structure, a track thereon, a carriage movable on the track, and including a rotatable support, manually operable means for causing the carriage to move away from a predetermined loading point under power, manually adjustable means disposed in the path of movement of the carriage acting to automatically stop the carriage when it has reached a predetermined position, manually operable means for causing the return of the carriage to its loading position under power, and means acting to automatically stop the carriage when it has reached its loading position.

In testimony whereof I hereunto affix my signature.

LUTHER ROAN.